(12) United States Patent
Matthiesen et al.

(10) Patent No.: US 8,596,943 B2
(45) Date of Patent: Dec. 3, 2013

(54) CHIPLESS THREAD-FORMING SCREW

(75) Inventors: Sven Matthiesen, Lindau (DE); Peter Hertlein, Ruggell (LI); Michael Baumgartner, Montlingen (CH)

(73) Assignee: Hilti Aktiengesellschaft, Schaan (LI)

( * ) Notice: Subject to any disclaimer, the term of this patent is extended or adjusted under 35 U.S.C. 154(b) by 1179 days.

(21) Appl. No.: 12/070,999

(22) Filed: Feb. 21, 2008

(65) Prior Publication Data

US 2008/0226424 A1    Sep. 18, 2008

(30) Foreign Application Priority Data

Mar. 15, 2007    (DE) .......................... 10 2007 000 154

(51) Int. Cl.
*F16B 25/06*    (2006.01)
(52) U.S. Cl.
USPC .............................................. 411/386
(58) Field of Classification Search
USPC ............ 411/386, 411, 424, 426, 387.1, 387.4
See application file for complete search history.

(56) References Cited

U.S. PATENT DOCUMENTS

| | | | | |
|---|---|---|---|---|
| 507,919 A * | 10/1893 | Morgan | ........................ | 411/426 |
| 3,246,556 A * | 4/1966 | Phipard | ........................ | 411/416 |
| 3,752,030 A * | 8/1973 | Steurer | ........................ | 411/411 |
| 3,942,405 A * | 3/1976 | Wagner | ........................ | 411/386 |
| 4,027,573 A * | 6/1977 | Laverty | ........................ | 411/413 |
| 4,194,430 A * | 3/1980 | Muenchinger | ........................ | 411/415 |
| 4,329,099 A * | 5/1982 | Shimizu et al. | ........................ | 411/412 |
| 5,417,776 A * | 5/1995 | Yoshino et al. | ........................ | 148/318 |
| 5,863,167 A * | 1/1999 | Kaneko | ........................ | 411/426 |
| 5,882,162 A * | 3/1999 | Kaneko | ........................ | 411/411 |
| 5,897,280 A * | 4/1999 | Dicke | ........................ | 411/411 |
| 7,037,059 B2 | 5/2006 | Dicke | | |
| 7,101,133 B2 | 9/2006 | Dicke | | |
| 2003/0210970 A1 | 11/2003 | Bechtel | | |

FOREIGN PATENT DOCUMENTS

| | | |
|---|---|---|
| EP | 0939 235 B1 | 9/1999 |
| GB | 1 508 100 | 4/1978 |
| JP | 2005-003147 A | 1/2005 |

* cited by examiner

*Primary Examiner* — Flemming Saether
(74) *Attorney, Agent, or Firm* — Abelman, Frayne & Schwab

(57) ABSTRACT

A chipless thread-forming screw (10) has a thread-carrying shank (11) provided at its opposite ends with a tip (13) and a head (4), respectively, and having a diameter between 0.25 and 0.35 mm, with the shank (11) having at least one frustroconical section (21) extending from the tip (13) in direction of the head (14) and having, with respect to the thread root (22), a point angle ($\alpha$) between 200 and 300, and a cylindrical section (25) extending between the frustroconical section (21) and the head (14), and with a starting line (23) of the thread (15) remote from the head (14) being spaced from the tip (13) by a distance ($L_t$) from 0 to 0.3 mm.

4 Claims, 2 Drawing Sheets

CHIPLESS THREAD-FORMING SCREW

BACKGROUND OF THE INVENTION

1. Field of the Invention

The present invention relates to a chipless thread-forming screw and, in particular, to a thread-forming screw for screwing metal sheets and having a thread-carrying shank, a tip provided at one end of the shank, and a head provided at another end of the shank. The shank has at least one frustroconical section extending from the tip in direction of the head, and a cylindrical section extending between the frustroconical section and the head.

2. Description of the Prior Art

U.S. Pat. No. 4,194,430 discloses a thread-forming screw having a head and a shank that adjoins the head. The shank passes at its end remote from the head in a frustroconical section and ends in a tip or a punctiform tip. The thread surrounds the shank, with the thread height continuously tapering from the end region of the shank up to the tip.

The drawback of such thread-forming screw consists in that it can form a thread in a hard material only in a pre-drilled bore. When the screw is used for not pre-drilled sheet metal, then it can primarily be used only for very thin sheets, such as used, e.g., in the motor vehicle industry. For screwing a stack with a plurality of sheets lying one above another, this screw is not suitable.

U.S. Pat. No. 5,597,357 discloses a self-drilling screw which is provided at an end of the screw shank remote from the head with a drilling tip. With this self-drilling screw, it is possible to penetrate sheet metal having a thickness of more than 2 mm.

The drawback of the above-described screw consists in that during a setting process, chips are produced which should be removed, for corrosion reasons, with great costs. Further, during a setting process, a user should apply a high press-on force during the entire process. In addition, drilling leads to loss of material which adversely affects the holding force of the screw.

Accordingly, an object of the present invention is to provide a screw in which the above-discussed drawbacks are prevented.

Another object of the present invention is to provide a thread-forming screw which would be able to chiplessly penetrate a stack of at least two metal sheets arranged one above another with a total thickness of the sheets of at least 2 mm.

SUMMARY OF THE INVENTION

These and other objects of the present invention, which will become apparent hereinafter, are achieved by providing a thread-forming screw of the type described above and in which the tip has a diameter between 0.25 and 0.35 mm, the frustoconical section has, with respect to a thread root, a point angle between 20° and 30°, and a starting line of the thread remote from the head is spaced form the tip by a distance from 0 to 0.3 mm.

The inventive geometry of the tip region permits to chiplessly penetrate sheets or sheet stacks with a total thickness up to 3.1 mm (steel sheet). With sheet metal, which has a hardness less than that of steel sheet metal, greater thicknesses can be penetrated by the inventive thread-forming screw.

Advantageously, the thread extends at least from the cylindrical section and over the frustoconical section with a thread height tapering toward the tip in the frustoconical section. The tapering of the thread height permits to achieve good screw-in characteristics, so that the screw, after the first penetration, is automatically pulled into the material or constructional component upon being screwed in.

It is further advantageous when the thread height is defined in the region of the frustoconical section by a function:

$$H=((\tan(\alpha/2)+F_B)*X+0.2\text{ mm})-R_K$$

wherein:

α—is a point angle $F_B$—is a constant having a value of between 0.4 and 0.25, and $R_K$—is a radius of the screw core (radius from the axis A to the thread root) at a distance X to the tip.

Thereby, optimal screw-in characteristics of the screw are achieved.

Advantageously, the cylindrical section of the shank has a diameter between 3.0 and 6.3 mm. This provides for a good adaptation of the necessary screw-in and press-on force to the penetration characteristics of the inventive thread-forming screw.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
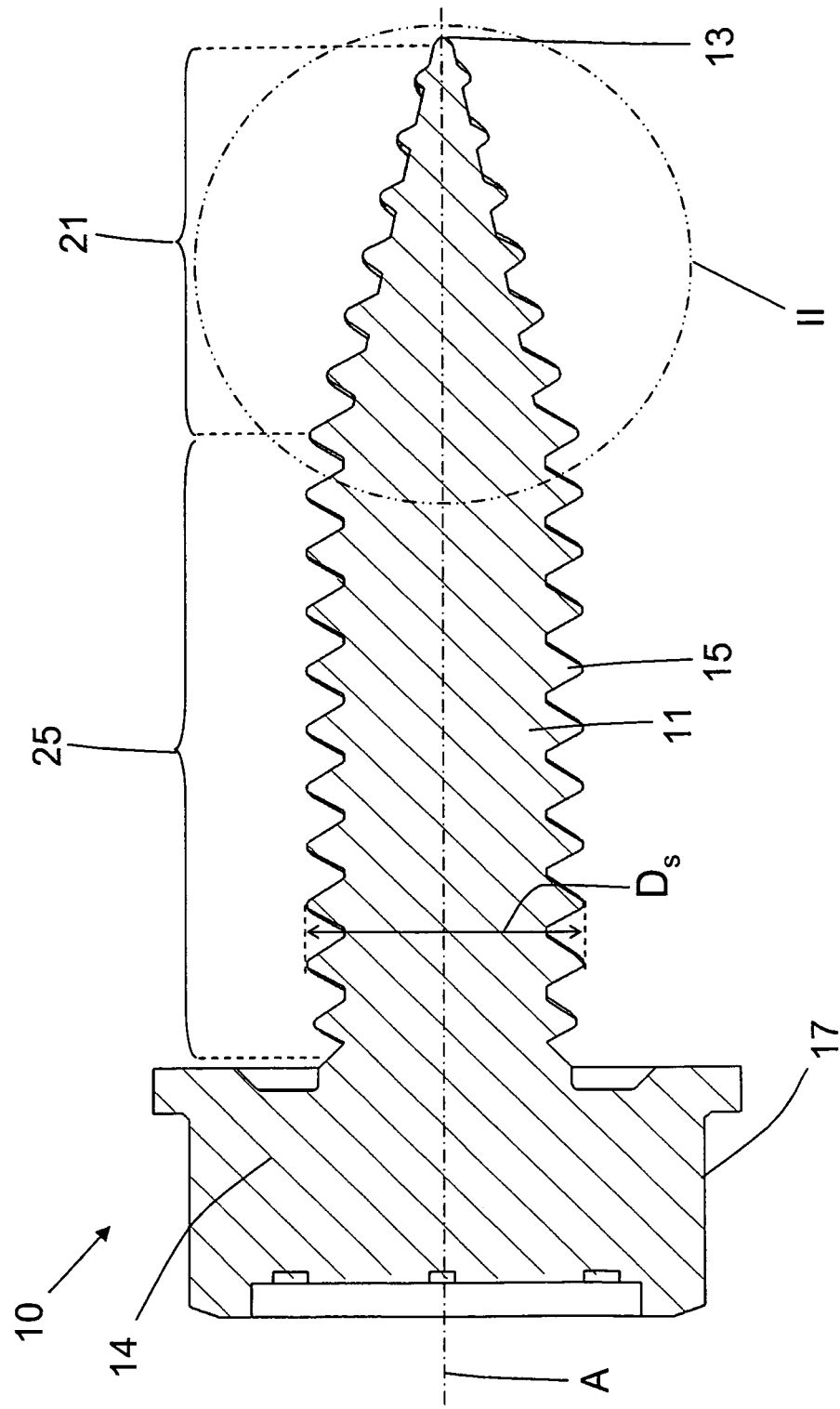
FIG. 1 a longitudinal cross-sectional view of bore- and thread-forming screw according to the present invention.

A chipless bore- and thread-forming screw 10 according to the present invention, which is shown in FIG. 1, has a shank 11 that carries a thread 15 and has a punctiform tip 13 at one of its ends and a head 14 at another, opposite end. An axis A defines an axial direction of the screw 10. The head 14 has load application means 17 for a screw-driving tool such as a screwdriving bit or wrench. A frustoconical section 21 extends from the tip 13 in the direction of the head 14. A cylindrical section 25 adjoins an end of the frustoconical section 21 remote from the tip 13. The cylindrical section 25 has a diameter $D_S$ of about 3.0-6.3 mm.

Figure 2:
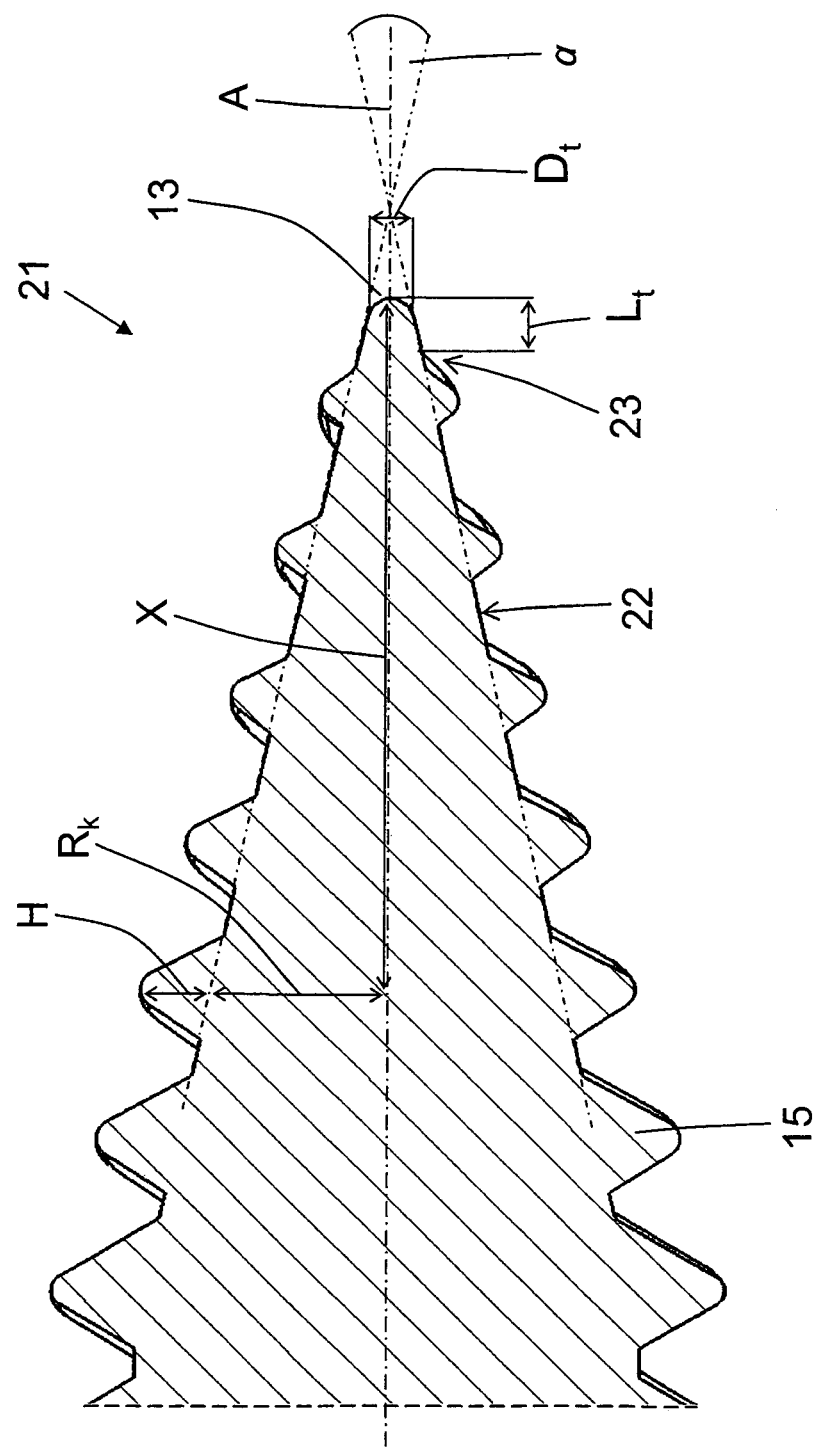
FIG. 2 a cross-sectional view, at an increased, in comparison with FIG. 1, scale, of a detail II in FIG. 1.

As particularly shown in FIG. 2, the frustoconical section 21 has, with respect to the root of the thread 22, a point angle α between 20° and 30°. The tip 13 has a diameter $D_t$ between 0.25 and 0.35 mm.

The thread 15 has a thread height H that remains substantially constant in the region of the cylindrical section 25. In the region of the frustoconical section 21, the thread height H tapers in the direction of the tip 13. The starting line 23 of the thread 15 lies at a distance $L_t$ of 0 to 0.3 mm from the tip 13. The thread height H in the region of the frustoconical section 21 is defined by a function:

$$H=((\tan(\alpha/2)+F_B)*X+0.2\text{ mm})-R_K$$

wherein:

α—is a point angle $F_B$—is a constant having a value of between 0.4 and 0.25, and $R_K$—is a radius of the screw core (radius from the axis A to the thread root) at a distance X to the tip.

In order to reduce friction, the screw 10 can be provided in the region of the shank 11 with a friction-reducing coating such as, e.g., wax or cutting oil.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A chipless thread-forming screw (10) for securing a stack of a plurality of metal sheets having a total thickness between 2 and 3.1 mm, the screw comprising a shank (11) carrying, at least regionwise, a thread (15); a tip region provided at one end of the shank (11); and a head (14) provided at another opposite end of the shank (11), the shank having a frustoconical section (21) extending from the tip region in direction of the head (14), and a cylindrical section (25) extending between the frustoconical section (21) and the head (14), wherein the tip region has a shape different from a shape of the frustoconical section (21) of the shank (11), a base extending transverse to a screw axis and from which the frustoconical section (21) extends and which has a diameter between 0.25 and 0.35 mm, and a non-pointed tip (13) spaced from the base, wherein the frustoconical section (21) has, with respect to a thread root (22), a point angle ($\alpha$) between 20° and 30°, and wherein a starting line (23) of the thread (15) remote from the head (14) is spaced from the tip (13) by a distance (Lt) from 0 to 0.3 mm.

2. A screw according to claim 1, wherein the thread extends at least from the cylindrical section (25) and over the frustoconical section (21), with a thread height (H) tapering toward the tip (13) in the frustoconical section (21).

3. A screw according to claim 2, wherein the thread height (H) in the frustoconical section (21) is defined by a function:

$$H=((\tan(\alpha/2)+F_B)*X+0.2\text{ mm})-R_K$$

wherein:

$\alpha$—is a point angle $F_B$—is a constant having a value of between 0.4 and 0.25, and $R_K$—is a radius of the screw core (radius from the axis A to the thread root (22)) at a distance (X) to the tip (13).

4. A screw according to claim 1, wherein the cylindrical section (25) of the shank (11) has a diameter ($D_S$) between 3 and 6.3 mm.

* * * * *